(12) United States Patent
Garner et al.

(10) Patent No.: US 10,948,453 B2
(45) Date of Patent: Mar. 16, 2021

(54) CHEMFET ARRAY

(71) Applicant: DNAe Diagnostics Limited, London (GB)

(72) Inventors: David Michael Garner, London (GB); Darya Mohtashemi, London (GB); Tuck Weng Poon, Fleet (GB)

(73) Assignee: DNAe Group Holdings Limited, London (GB)

( * ) Notice: Subject to any disclaimer, the term of this patent is extended or adjusted under 35 U.S.C. 154(b) by 0 days.

(21) Appl. No.: 16/346,999

(22) PCT Filed: Nov. 2, 2017

(86) PCT No.: PCT/GB2017/053304
§ 371 (c)(1),
(2) Date: May 2, 2019

(87) PCT Pub. No.: WO2018/083479
PCT Pub. Date: May 11, 2018

(65) Prior Publication Data
US 2019/0265191 A1    Aug. 29, 2019

(30) Foreign Application Priority Data
Nov. 7, 2016 (GB) ..................... 1618749

(51) Int. Cl.
*G01N 27/414* (2006.01)
(52) U.S. Cl.
CPC ................ *G01N 27/4148* (2013.01)

(58) Field of Classification Search
CPC ............. G01N 27/4148; C12Q 2565/607
See application file for complete search history.

(56) References Cited

U.S. PATENT DOCUMENTS

| | | | |
|---|---|---|---|
| 2007/0132085 A1* | 6/2007 | Shibata | G11C 29/022 257/686 |
| 2008/0245949 A1* | 10/2008 | Morimoto | G01J 3/51 250/205 |
| 2009/0189158 A1* | 7/2009 | Takemoto | H01L 23/5386 257/48 |
| 2010/0127791 A1* | 5/2010 | Fahs | H03J 3/08 333/17.1 |
| 2010/0304982 A1* | 12/2010 | Hinz | C12N 15/1093 506/7 |
| 2011/0234558 A1* | 9/2011 | Ludwig | H04N 9/0451 345/207 |
| 2012/0001056 A1* | 1/2012 | Fife | G01N 27/4148 250/208.1 |
| 2012/0265474 A1 | 10/2012 | Rearick et al. | |
| 2013/0321044 A1 | 12/2013 | Jordan et al. | |
| 2015/0002655 A1* | 1/2015 | Zheng | G01N 21/9501 348/87 |

(Continued)

OTHER PUBLICATIONS

Combined Search and Examination Report for GB App. No. 1618749.4 dated Apr. 18, 2017. 6 pages.

(Continued)

*Primary Examiner* — Peter Bradford
(74) *Attorney, Agent, or Firm* — Wolf, Greenfield & Sacks, P.C.

(57) ABSTRACT

An array of pixels, wherein each pixel comprises: a CHEMFET sensor; and a sigma delta ADC.

10 Claims, 5 Drawing Sheets

(56) References Cited

U.S. PATENT DOCUMENTS

2015/0109158 A1* 4/2015 Dong .................... H03M 3/344
341/143
2016/0245777 A1 8/2016 Kawahara et al.

OTHER PUBLICATIONS

International Search Report and Written Opinion for PCT/GB2017/053304 dated Jan. 2, 2018.

Garner et al., A multichannel DNA SoC for rapid point-of-care gene detection. 2010 IEEE International Solid-State Circuits Conference. Piscataway, NJ. Feb. 7, 2010. Digest of Technical Papers. 2010:492-3.

Laifi et al., A 96 dB SNDR current-mode continuous-time ΔΣ modulator for electrochemical sensor arrays. 2015 22nd International Conference Mixed Design of Integrated Circuits & Systems (MIXDES). Jun. 25, 2015. Department of Microelectronics and Computer Science. Lodz University of Technology. 2015:239-42.

* cited by examiner

CHEMFET ARRAY

RELATED APPLICATIONS

This application is a national stage filing under 35 U.S.C. § 371 of international application number PCT/GB2017/053304, filed Nov. 2, 2017, which claims the benefit of British application number GB 1618749.4, filed Nov. 7, 2016, each of which is herein incorporated by reference in its entirety.

This invention relates to improvements in or relating to the detection of chemical and biological reactions in an electrolyte solution, using semiconductor-based devices; specifically, Ion-Sensing Field Effect Transistors (ISFETS).

It is well known to provide an array of pixels for detecting chemical and biological reactions. The sensors used in such arrays are semiconductor devices and a great deal of interest and research has gone into the use of ISFET devices. ISFETs can be used to measure the hydrogen ion concentration or pH of an electrolyte solution. ISFETs are popular because they can be fabricated within a conventional Complementary Metal Oxide Semiconductor (CMOS) technology, resulting in large array of pH sensors alongside high resolution data acquisition circuits.

In order to measure and record these reactions, it is well known to divide the array into columns of pixels and to provide an Analogue to Digital Converter (ADC) for each column. This is known as column parallel architecture and it has served the industry well for many years. The provision of a single ADC for each column reduces the hardware requirement as the ADC is configured to sample each of the pixels within a column, or multiple columns, sequentially thereby building up, over time, an output from each pixel.

It is against this background that the present invention has arisen.

According to the present invention there is provided an array of pixels, wherein each pixel comprises: a CHEMFET sensor; and an ADC. The CHEMFET sensor may be an ISFET sensor.

The provision of an ADC within each pixel allows the analogue to digital conversion to take place within the pixel itself, rather than outside the pixel, as dictated by the column parallel architecture which forms the status quo within the technical field.

The provision of an ADC within each pixel allows simultaneous sampling of the analogue signal generated by all of the ISFETs within the array and conversion of this into a digital signal that can be output from each pixel.

The provision of an ADC within each pixel means that space does not need to be allocated on the chip for ADCs outside the sensor array. The provision of the ADC within each pixel effectively frees up space on the chip in comparison with column parallel architecture.

A further advantage of the provision of the ADC within the pixel, is that the array is fully scalable.

The ADC may be a sigma delta ADC, a SAR ADC, a Single-slope ADC, a dual-slope ADC, a FLASH ADC or a pipelined ADC or a combination of the aforementioned architectures. The ADC may be differential or single ended. The sigma delta ADC may be advantageous because it provides a higher resolution than other ADCs. A sigma delta ADC is also advantageous because it is an over sampling ADC and this sampling is done at a frequency much higher than the so-called "Nyquist" frequency, which is a frequency twice that of the signal bandwidth of interest. The technical effect of such a high frequency is that noise prior to the ADC sampling is effectively folded down to lie with a frequency range of 0 Hz to the half of the sampling frequency after sampling. This noise, together with the signal, then goes through a low pass decimation filter with a cut-off frequency of the signal bandwidth of interest and this filter thereby removes almost all of the noise.

This is in contrast with other types of ADC where the noise only folds down at the lower sample frequency, which is equal to the Nyquist frequency. As a result of this all of the noise is retained within the signal.

The sigma delta ADC may be a single ended first order sigma delta ADC which has the advantage of providing the smallest available architecture therefore enabling the invention to be implemented within the minimum possible area. A 1-bit first order sigma delta ADC particularly lends itself to incorporation within a pixel as all that is required to facilitate the operation of such an ADC is an amplifier, a comparator, a sample capacitor and an integration capacitor. The 1-bit first order sigma delta ADC does not require any accurate analog components such as transistors, resistors or capacitors. The required components occupy a smaller silicon footprint than other ADCs. As a result, the pixel size is reduced in comparison with that which would be required to accommodate other ADC types. Therefore the pixel density is increased thereby providing more pixels within a fixed area.

Alternatively, the sigma delta ADC may be a second, third, fourth, fifth or sixth order sigma delta ADC.

Each pixel may further comprise bias control to control the amount of current in the pixel. The provision of the bias control within the pixel, rather than outside of the pixel is for noise control purposes as the positioning of the bias control within the pixel prevents noise from propagating from one pixel to the next through the bias control.

Each pixel may have an area in the region of 100 µm×100 µm, or 50 µm×50 µm or 25 µm×25 µm, or 10 µm×10 µm or even 2.5 µm×2.5 µm. The pixel may be square, or it may be rectangular. In order to increase the packing density of the pixels, hexagonal pixels may be used.

The array may comprise many pixels. There may be in the region of 4000 pixels, or 6 million or even 100 million pixels. For example, the array may be 40×96 pixels or 256×160. Because the pixels each include an ADC, they are fully scalable and therefore can be formed into an array of any practical size depending on the application for which the array will be used.

Each pixel may further comprise a switch configured to control the flow of data from the pixel onto a column on which each pixel is located.

Furthermore, according to the present invention there is provided a chip comprising: an array of pixels as discussed above and a clocking arrangement comprising a first clock signal common to all of the pixels in the array, for sampling the ISFET signal; and a second clock signal provided sequentially across the array, for conversion of the signal.

The provision of a first clock signal that is common to all of the pixels enables the simultaneous sampling of the analogue ISFET signal in each of the pixels.

The chip may be further configured to comprise control signals for each pixel that enable the ISFET and the ADC within each pixel to be switched on only when required. This provides considerable reduction in the power required to operate the array and consequent efficiency improvements in terms of unwanted heat within the array.

Furthermore, according to the present invention there is provided a device comprising: an array of wells each configured to receive a biological or chemical substance, wherein the array of wells is provided over a chip as discussed above.

This configuration provides considerable advantages over the column parallel architecture which forms the state of the art in this field, in that it enables the sampling of the ISFET signals from all pixels simultaneously. When the wells contain biological or chemical substances in which reactions may be taking place, the sampling of all of the ISFET signals at the same time ensures that the reactions taking place within the wells are all at the same point when the sample is taken. There is therefore no need to make allowances for differences in sample time when all of the samples have been taken at the same time.

Once the sampling of all of the ISFETs has occurred simultaneously, then the conversion of the signal to a digital form may be staggered. If it is staggered then the entire pixel array is sampled at the same time whilst minimising the peak current consumption of the array.

The invention will now be further and more particularly described, by way of example only, and with reference to the accompanying drawings, in which:

FIG. 1 is a pixel block diagram showing a single 100 μm square pixel 10 which contains an ISFET 12, which is directly connected to a Sigma Delta ADC 14. The Sigma Delta ADC 14 is provided with ADC reference voltages $V_{REF}$ and is configured to perform the conversion of the analogue signal from the ISFET 12 into a digital bitstream.

The pixel 10 also includes bias control 16 which receives a bias current $I_B$ from outside the pixel 10. The bias current $I_B$ is in the region of 0.1 μA to 100 μA, for example 2 μA and is used to provide bias control to the ISFET 12 and the Sigma Delta ADC 14.

The pixel 10 also includes a switch 18 which is configured to control the data output O from the pixel 10. When the switch 18 is activated, it connects the data output O from the Sigma Delta ADC 14 to a column line which is provided outside the pixel 10.

Figure 1:
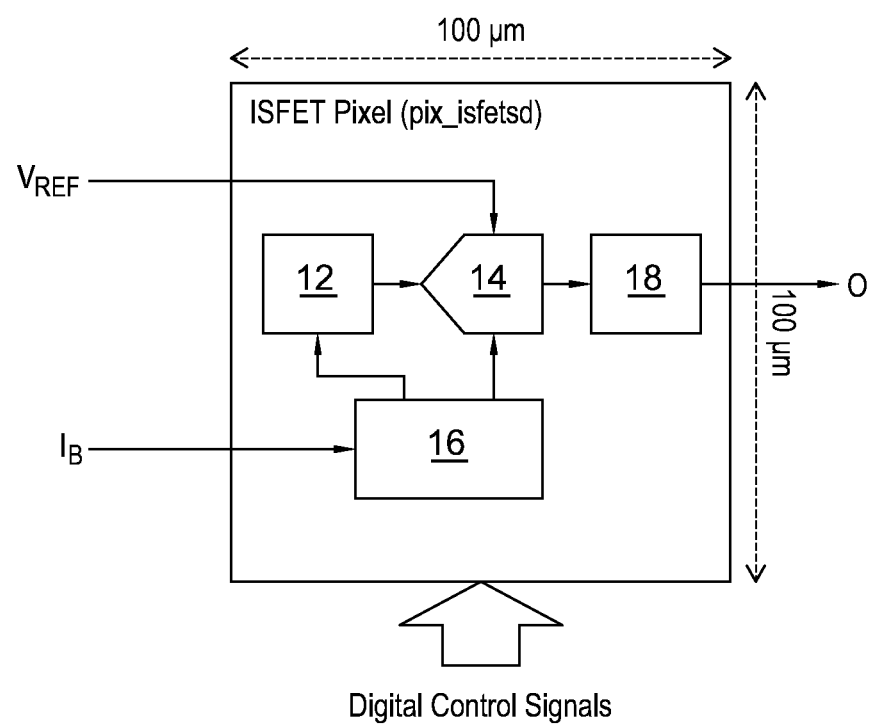
FIG. 1 shows a pixel block diagram.
Figure 2:
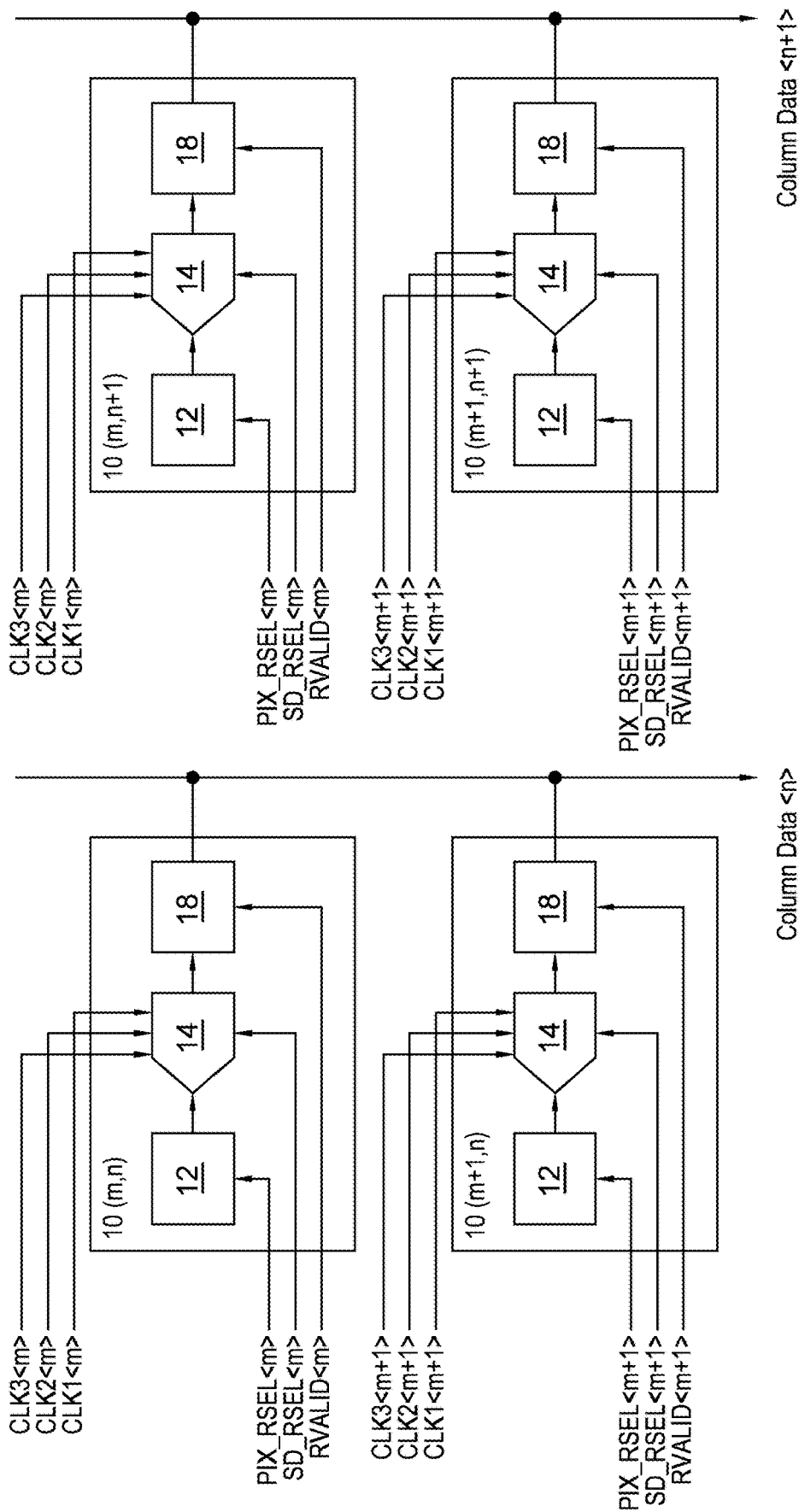
FIG. 2 shows the connectivity of control signals and data output from an exemplary four pixels.

FIG. 2 shows the connectivity of the control signals and data output for an exemplary set of four pixels 10. For reasons of clarity, the bias control has been omitted. The pixels 10 are each allocated a row and column number. The data outputs of all of the pixels 10 in each column n, n+1, n+2 etc. are connected. Each row of pixels is enumerated m, m+1, m+2 etc. A switched capacitor implementation of a single-ended first order sigma delta modulator is used as the ADC. The ISFET 12 is a source follower NMOS floating gate transistor with its bulk tied to its source. In an alternative embodiment, not illustrated in the accompanying drawings, the single-ended first order sigma delta modulator is provided in a continuous time specification.

In the illustrated embodiment, the main control signals for the pixel 10 are: CLK1, CLK2, CLK3, PIX_RSEL, SD_RSEL, and RVALID. CLK1 is used to sample the output from all of the ISFETs 12, while CLK2 and CLK3 are used to do the ADC conversion. PIX_RSEL and SD_RSEL are the row enable signals for the ISFETs 12 and Sigma Delta ADCs 14, respectively. The data from the SD ADC 14 is arranged in columns and is controlled by the corresponding RVALID signal, which indicates when data is valid on each row. To reduce power consumption, the pixels 10 are only turned on when needed.

One advantage of integrating the Sigma Delta ADC 14 into every pixel 10 is that the entire pixel array 100 can be sampled at the same time, therefore capturing the output of all the ISFETs 12 at the same point in time for every frame capture. This is a very useful feature for when it comes to processing the data, as allowances do not need to be made for the difference in time capture of the samples when a column parallel architecture is used and the array is sampled row by row. To achieve simultaneous sampling of the entire array illustrated in FIG. 2, CLK1 needs to be common to all the pixels. However, as CLK2 and CLK3 are only used to do the ADC conversion, they can be staggered between all the pixels 10 to reduce peak current consumption.

Figure 3:
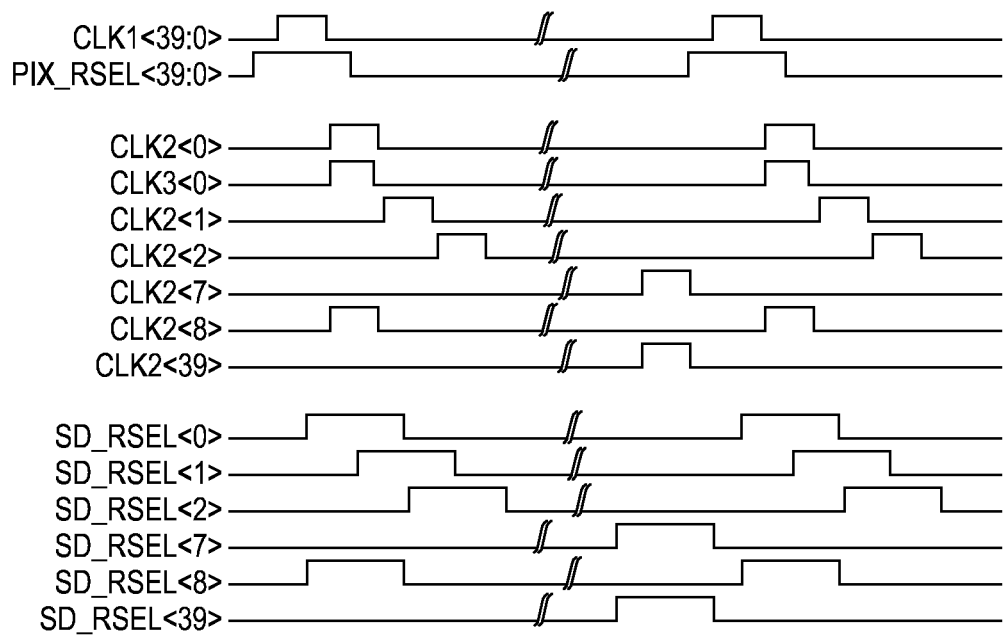
FIG. 3 is a pixel timing diagram.

FIG. 3 is a timing diagram of the control signals. The ISFETs 12 are all sampled at the same time via CLK1<39:0>. Subsequently, the analogue to digital conversion takes place in a staggered fashion via CLK2<39:0> and CLK3<39:0>. The only difference between CLK2<m> and CLK3<m> is that the falling edge of CLK3<m> occurs slightly before the falling edge of CLK2<m> (for simplicity, only CLK3<0> has been shown in FIG. 3). The pattern of CLK2 and CLK3 is repeated every 8th row as there is insufficient time to stagger all 40 rows within an oversampling period.

To reduce power consumption, the ISFET 12 and ADC 14 blocks within the pixels 10 are only turned on when needed. This is achieved by turning on the corresponding PIX_RSEL and SD_RSEL signals in advance of CLK1 and CLK2 respectively.

Figure 4:
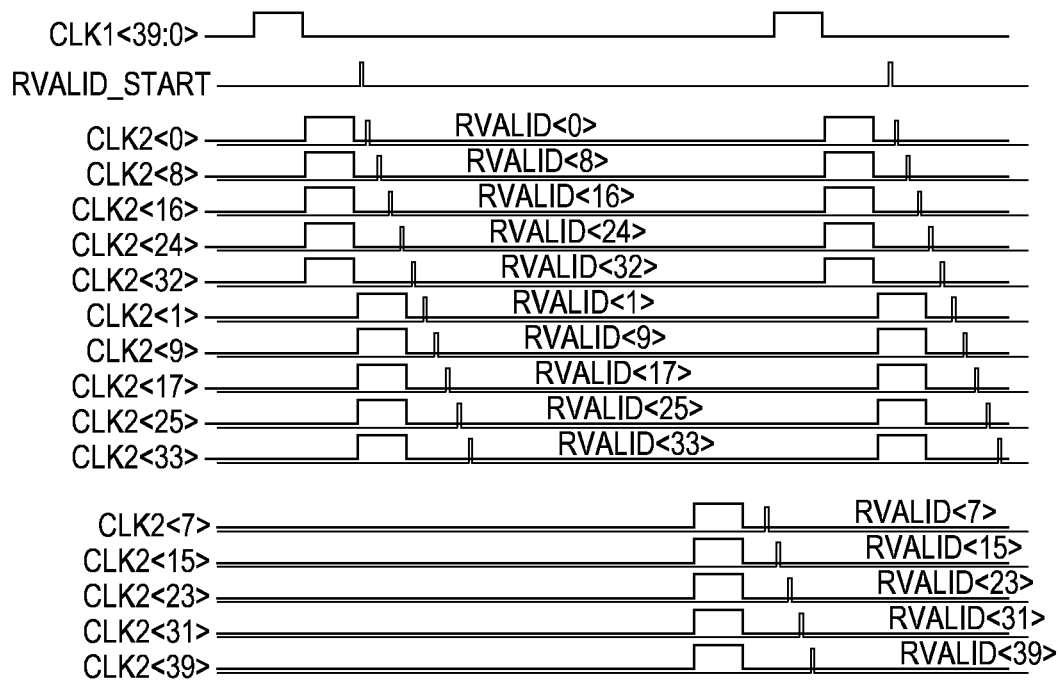
FIG. 4 is an RVALID timing diagram.

With reference to FIG. 4, as there is only one data pin for every column, RVALID is used to latch the bitstream for each row of the pixel array to the output pin. Data for each pixel is only valid when RVALID is set high. RVALID_START is used to indicate the start of a new frame. All data collected within 2 RVALID_START pulses belong to the same frame.

When the RVALID signals for all the rows are LOW, the column data line is pulled to digital ground (GNDD) by a pull down resistor. This prevents the input to the digital controller from floating to an indeterminate voltage.

Figure 5:
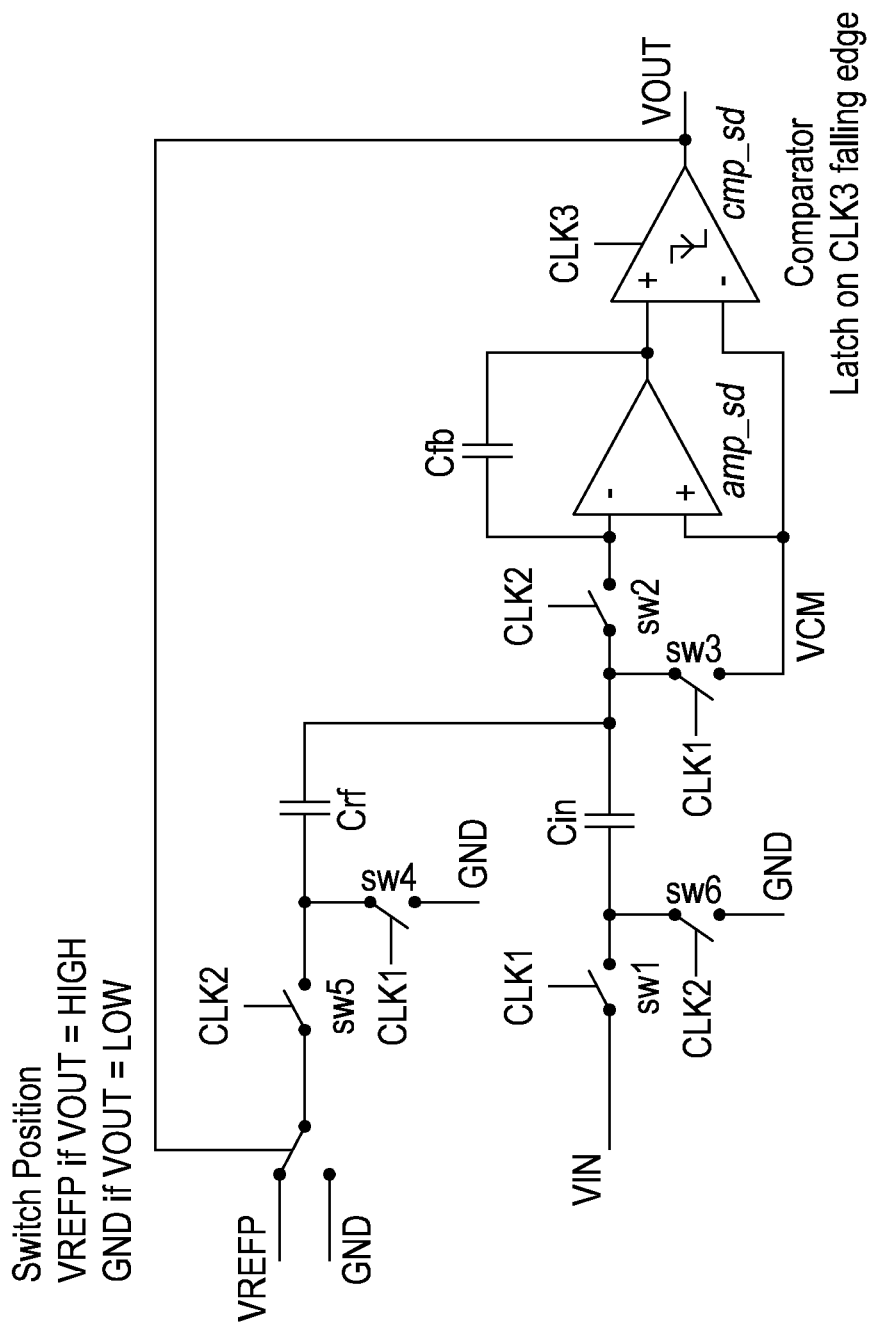
FIG. 5 is a sigma delta ADC block diagram.

A block diagram of a single-ended first order sigma delta ADC is shown in FIG. 5. This ADC is based on a switched capacitor network and operates at an oversampled frequency of 30 kHz. Assuming an oversampling ratio (OSR) of 512, the downsampled sample rate is thus just under 58.6 Hz and the maximum signal bandwidth that recovered is no more than half that. In combination with a low-pass decimation filter with a cut-off frequency of the signal bandwidth of interest, this results in the noise present before the sampling being folded down and then effectively eliminated by the low-pass decimation filter.

As will be apparent from FIG. 5, the negative reference voltage is set to the analogue ground (GNDA) to reduce the number of signals going into the pixel 10. Both the positive reference voltage, VREFP, and the common mode reference voltage, VCM, are buffered within each pixel 10 to reduce noise coupling across the rows of pixels 10 in the array 100.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

Figure 6:
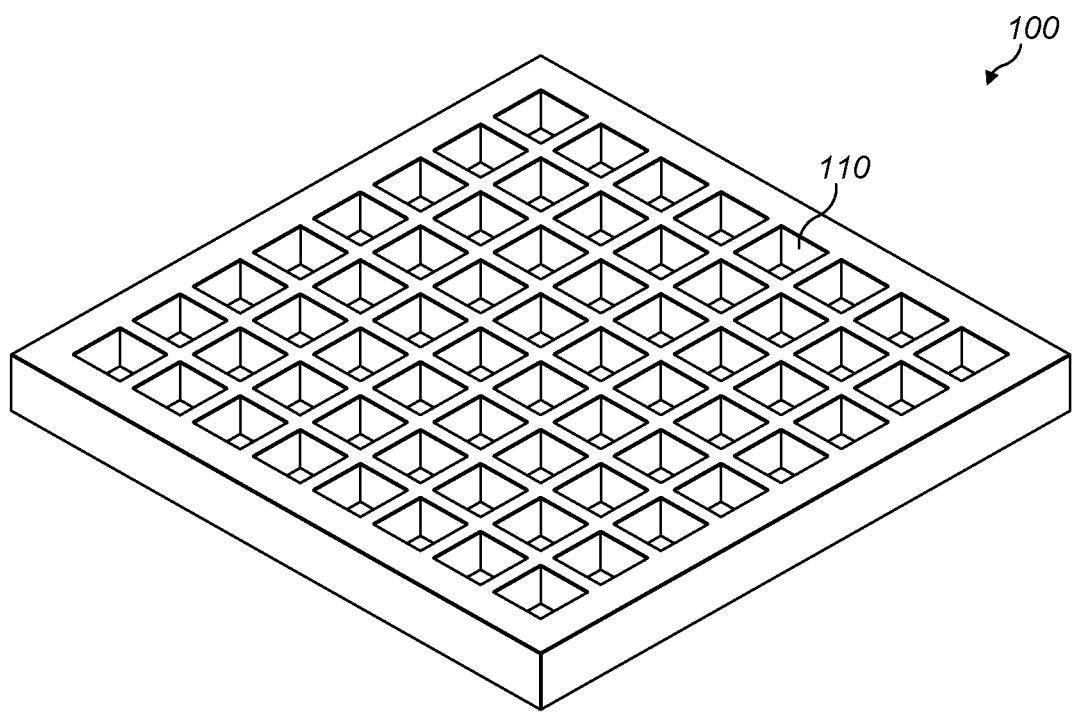
FIG. 6 shows a device comprising a chip and an array of wells.
Figure 6:
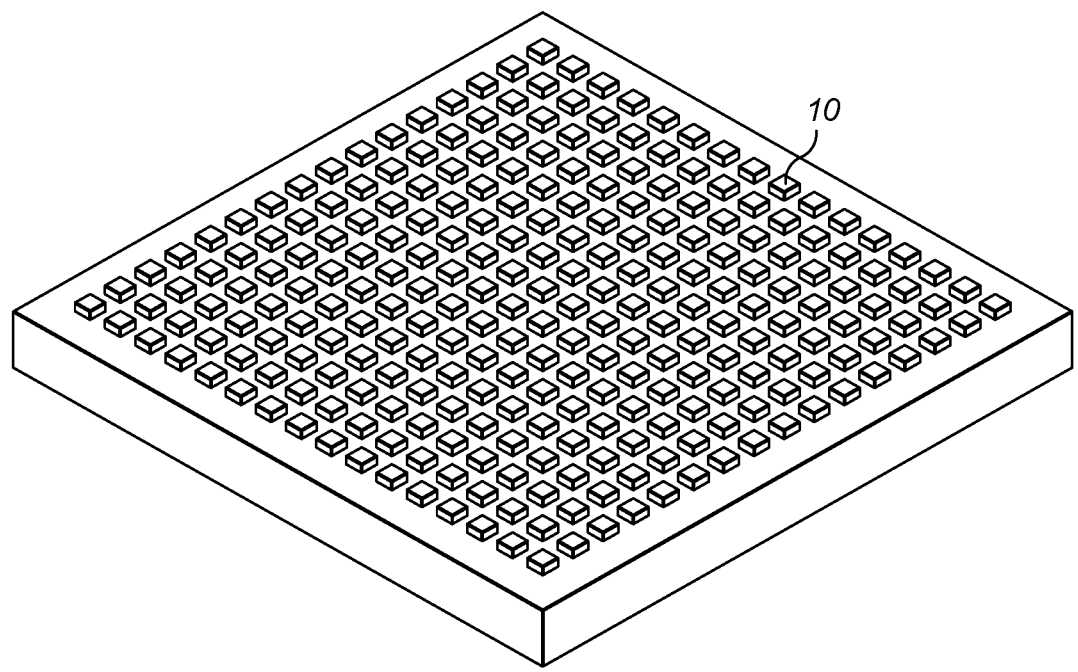

FIG. 6 shows a device 100 comprising a chip and an array of wells 110. The chip is formed from an array of pixels 10 that are provided beneath the array of wells 110.

The invention claimed is:

1. A chip comprising:
an array of pixels, wherein each pixel comprises:
an ISFET sensor;
a sigma delta ADC; and
clocking circuitry;
wherein the clocking circuitry is configured to provide a first clock signal common to all of the pixels in the array, for sampling the ISFET signal; and
wherein the clocking circuitry is configured to provide a second clock signal sequentially across the array for conversion of the first clock signal.

2. The chip according to claim 1, wherein the clocking circuitry is further configured to provide control signals for each pixel that enable the ISFET and the ADC within each pixel to be switched on only when required.

3. A device comprising an array of wells each configured to receive a biological or chemical substance, wherein the array of wells is provided over a chip according to claim 1.

4. The device according to claim 3, wherein each well covers more than one pixel.

5. The chip according to claim 1, wherein the sigma delta ADC is a single ended first order sigma delta ADC.

6. The chip according to claim 5, wherein each pixel further comprises bias control.

7. The chip according to claim 6, wherein each pixel has an area in the region of 100 µm×100 µm.

8. The chip according to claim 7, wherein the array comprises about 4000 pixels.

9. The chip according to claim 8, wherein each pixel further comprises a switch configured to control the flow of data from the pixel.

10. The chip according to claim 6, wherein each pixel further comprises a switch configured to control the flow of data from the pixel.

* * * * *

UNITED STATES PATENT AND TRADEMARK OFFICE
CERTIFICATE OF CORRECTION

Page 1 of 1

PATENT NO. : 10,948,453 B2
APPLICATION NO. : 16/346999
DATED : March 16, 2021
INVENTOR(S) : David Michael Garner et al.

It is certified that error appears in the above-identified patent and that said Letters Patent is hereby corrected as shown below:

On the Title Page

Foreign Application Priority Data Item (30) should be amended as shown below:
Nov. 7, 2016 (GB)...........................1618749.4

Signed and Sealed this
First Day of June, 2021

Drew Hirshfeld
*Performing the Functions and Duties of the
Under Secretary of Commerce for Intellectual Property and
Director of the United States Patent and Trademark Office*